Patented Apr. 13, 1926.

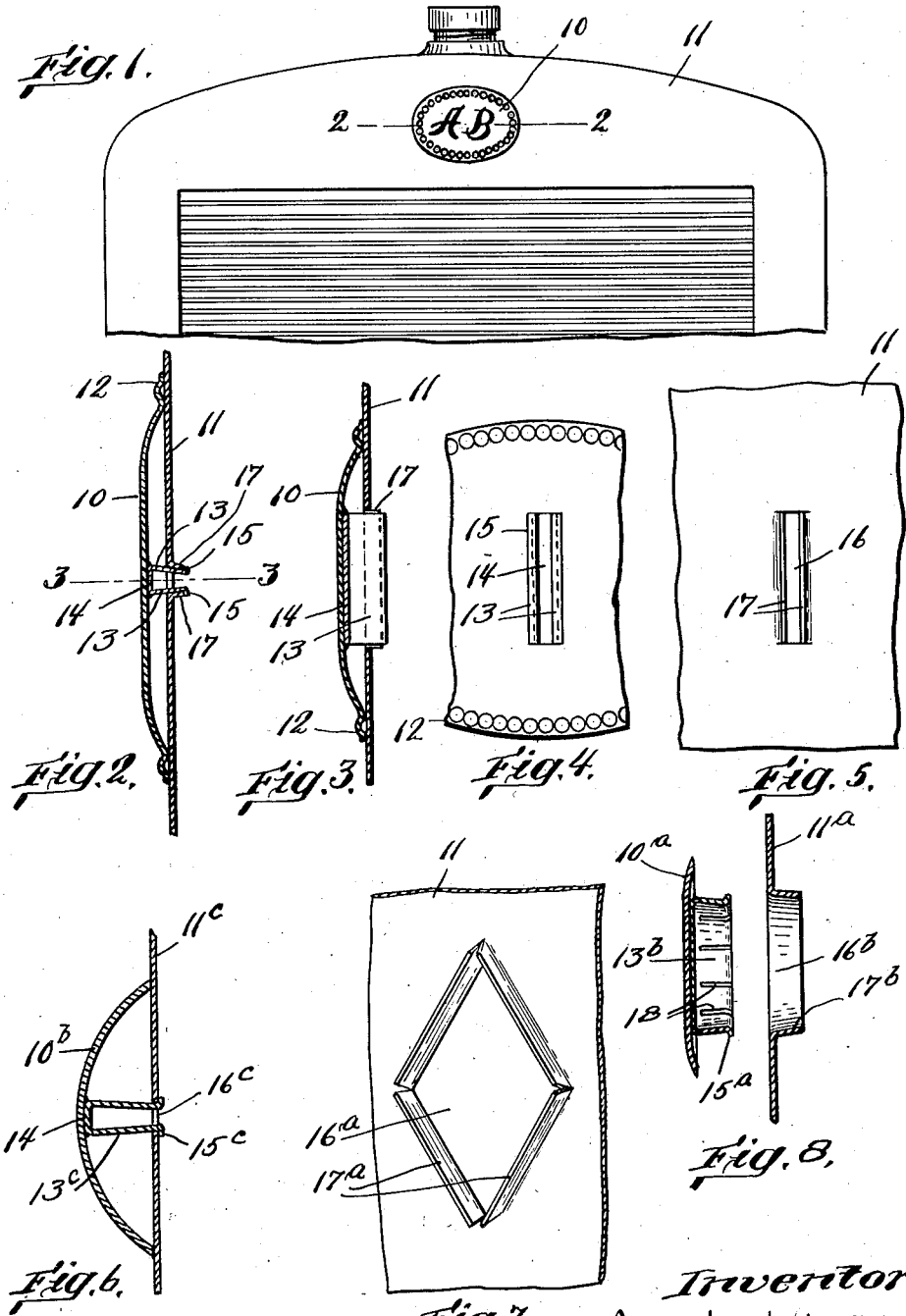

1,581,006

UNITED STATES PATENT OFFICE.

MATTHEW J. McCLARENCE, OF TAUNTON, MASSACHUSETTS, ASSIGNOR, BY MESNE ASSIGNMENTS, TO EVANS STAMPING & PLATING COMPANY, OF TAUNTON, MASSACHUSETTS, A CORPORATION OF MASSACHUSETTS.

FASTENING DEVICE.

Application filed March 3, 1923. Serial No. 622,484.

*To all whom it may concern:*

Be it known that I, MATTHEW J. McCLARENCE, a citizen of the United States, residing in Taunton, in the county of Bristol and State of Massachusetts, have invented an Improvement in Fastening Devices, of which the following is a specification.

This invention relates to fastening devices adapted to secure fixedly and permanently an attaching plate, or the like, to a second or holding plate, or the like, and has particular reference to fastening devices adapted to secure the name plate of an automobile to the radiator shell thereof, although not necessarily limited to such specific use.

The name plate of an automobile is usually attached to the radiator shell merely by frictional means and, for this purpose, the radiator shell usually has a circular aperture in it and the name plate usually has a boss which is adapted to be a tight press fit in the aperture.

This method of attachment is not entirely satisfactory for it often happens, for various reasons, that the name plate becomes loose on the radiator shell and drops off, thereby defeating the purpose of the name plate and, furthermore, exposing an unsightly hole in the radiator shell. Furthermore, with the method of attachment above described, it is possible to secure the name plate improperly to the radiator shell, as, for instance, the name plate may be inclined instead of horizontal and may thereby present an unsightly appearance.

An object of this invention is the provision of fastening means, especially adapted to attach a name plate to a holding plate, as the radiator shell of an automobile, and so constructed and arranged that the name plate may be easily attached by hand; and when attached may be held permanently in position; that is so arranged that the name plate cannot be fastened to the holding plate in other than the desired position; and that is simple and inexpensive in construction.

A further object is generally to improve the construction of fastening devices.

Fig. 1 is a front elevation, partially broken away, of an automobile radiator having a name plate attached permanently thereto in accordance with this invention.

Fig. 2 is a section along line 2—2 of Fig. 1.

Fig. 3 is a section along line 3—3 of Fig. 2.

Fig. 4 is a detailed view of the reverse side of the name plate.

Fig. 5 is an elevation in detail, of the locking aperture in the radiator shell or holding plate.

Fig. 6 is a sectional view of a name plate.

Fig. 7 represents a modified form of locking aperture in the radiator shell.

Fig. 8 represents a further modified locking arrangement for the name plate and radiator shell.

As here shown, the name plate, or attaching plate, 10 is secured permanently to the radiator shell, or holding plate 11. Said name plate may be of any suitable shape and have a suitable design or insignia thereon, following customary practice. Preferably said plate is raised at its middle portion so that the plate, when applied to the radiator shell, is or may be in contact therewith mainly at the outer edge-portion 12 thereof; and said edge-portion is or may be adapted to fit snugly against the radiator shell, whereby to enhance the appearance of the plate and shell.

The fastening means for said plate 10 may include the two relatively resilient arms 13 which are or may be integrally formed with the rear connecting and separating member 14. Said arms 13 are preferably, although not necessarily, relatively closely spaced and have a substantial width, as illustrated in Fig. 3, whereby to provide a support for said plate against any substantial angular displacement thereof on said radiator shell.

Said plate 10 may be formed or provided with said arms 13 in any suitable manner; for instance, said arms 13 and connecting and separating member 14 may be soldered or otherwise secured to the rear face thereof, and preferably in the middle of the raised portion of said name plate; and said arms may extend preferably approximately perpendicular to the plate and especially to the plane of the edge portion 12 of said plate. Preferably said arms are adapted to extend beyond the plane of the edge portion 12 and enter a suitably formed locking aperture in the radiator shell or holding plate 11; and the ends of said arms are or may be formed with the oppositely laterally extended end-extensions or locking projections 15 which, preferably, are adapted to be approximately perpendicular to said arms.

The radiator shell or plate 11 is formed or provided with a locking aperture 16 therein; and said aperture is adapted to be complemental with the shape and arrangement of said arms 13, and is preferably, although not necessarily, rectangular in shape. Said shell or plate 10 may be formed or provided with two opposed and approximately parallel lips 17 which extend rearwardly from the opposed long edges of the aperture 16 and the ends thereof are adapted to be engaged by the locking projections 15, which projections are adapted to be held in the rear of and in engaging relation with said lips by the inherent resiliency of said arms; and consequently the name plate may be held securely and permanently attached to the shell or attaching plate 11.

In attaching the name plate 10 to the shell 11, the arms 13 are inserted in the aperture 16 and pressed forwardly; and the arms may flex inwardly toward each other to admit such forward movement. When the locking projections 15 are moved toward the rear of the shell 11 sufficiently to clear the rear edge of the lips 17, the tension on said arms 13 is released and said arms are moved outwardly by their own spring action and consequently move said lateral extensions into a position behind and in engaging relation with said lips 17 and, consequently, said lips and projections serve to hold the name plate permanently to said shell against subsequent detachment therefrom.

Preferably said arms 13 and lips 17 are so proportioned that, when the name plate is locked permanently in position, the edge 12 of the name plate lies snugly in contact with the shell or plate 11. Preferably, also, said arms 13 and lips 17 are inclined slightly inward whereby to facilitate the insertion of said arms 13 in the shell 11, and cause said arms to be flexed somewhat in the locking position thereof whereby the locking projections will be held securely in holding engagement with the ends of said lips.

The locking aperture 16 in the shell or plate 11 is preferably non-circular in shape and the arms 13 are preferably so arranged as to engage the holding plate at the edges of the aperture, whereby the name plate may be held securely in position against detrimental angular displacement on said shell or plate. Fig. 7 illustrates a modified arrangement of shell or plate, wherein a diamond shaped locking aperture 16$^a$ is provided in the shell, and lips 17$^a$ extend outwardly from the sides of the apertures, and said apertures and lips are adapted to receive complementary-arranged locking arms of a name or attaching plate not necessarily illustrated.

In Fig. 8 the holding plate 11$^a$ is formed with the circular locking aperture 16$^b$ and the annular outstanding flange 17$^b$ surrounding said aperture and disposed on the rear face of said holding plate. The attaching plate 10$^a$ is or may be formed with the outstanding circular flange 13$^b$ having the annular outwardly-extended projection 15$^a$ at the end thereof; and said flange may be formed with a plurality of longitudinal slots 18 therein whereby to form a plurality of resilient locking arms corresponding to the arms 13 of Fig. 2. The function of this modification is essentially the same as that of the structure illustrated in Fig. 2.

Under certain conditions the locking lips 15 may be omitted, as illustrated in Fig. 6. As shown in this figure, the attaching plate 10$^b$ is or may be relatively deep at its middle portion and the arms 13$^c$ are or may be relatively long and flexible. The shell or plate 11$^c$ may be formed with the locking aperture 16$^c$ only, and the lips may be omitted. The locking projections 15$^c$ are adapted to be inserted through the aperture and engage the rear face of the plate 11$^c$ at the edges of the aperture, and hold the plate securely and permanently in position.

Preferably either said arms 13 or said lips 17 are relatively flexible whereby to ensure positive locking of the arrangement although it is not essential which are the relatively flexible members.

It is to be noted that, when the radiator shell 11 is assembled on an automobile, the rear face thereof is concealed and, therefore, access cannot readily be obtained to the ends of the arms 13. Said arms are covered, at the front of the shell, by the name plate and, consequently, said name plate, when once applied, cannot readily be removed.

The structure may be otherwise modified without departing from the spirit of the invention.

I claim:

The combination of an attaching plate and a holding plate having a rectangular aperture therethrough and lips extending rearwardly from two sides of said aperture, said attaching plate having two arms converging toward each other, extending through said aperture and engaging said holding plate at the edges of said aperture and said lips lengthwise thereof whereby to secure said attaching plate against angular displacement, said arms having lateral end-extensions engaging the ends of said lips whereby said attaching plate is fixedly secured to said holding plate.

In testimony whereof, I have signed my name to this specification.

MATTHEW J. McCLARENCE.